United States Patent
Ostendorf et al.

(10) Patent No.: US 12,497,511 B2
(45) Date of Patent: Dec. 16, 2025

(54) CROSSLINKABLE ORGANOPOLYSILOXANE COMPOSITIONS

(71) Applicant: WACKER CHEMIE AG, Munich (DE)

(72) Inventors: Detlev Ostendorf, Dresden (DE); Michael Stepp, Ueberackern (AT)

(73) Assignee: Wacker Chemie AG, Munich (DE)

( * ) Notice: Subject to any disclaimer, the term of this patent is extended or adjusted under 35 U.S.C. 154(b) by 1340 days.

(21) Appl. No.: 17/267,142

(22) PCT Filed: Aug. 17, 2018

(86) PCT No.: PCT/EP2018/072356
§ 371 (c)(1),
(2) Date: Feb. 9, 2021

(87) PCT Pub. No.: WO2020/035152
PCT Pub. Date: Feb. 20, 2020

(65) Prior Publication Data
US 2021/0309856 A1 Oct. 7, 2021

(51) Int. Cl.
| | | |
|---|---|---|
| *C08L 83/04* | (2006.01) | |
| *C08G 77/00* | (2006.01) | |
| *C08G 77/12* | (2006.01) | |
| *C08G 77/20* | (2006.01) | |
| *C08K 5/56* | (2006.01) | |

(52) U.S. Cl.
CPC ............. *C08L 83/04* (2013.01); *C08G 77/12* (2013.01); *C08G 77/20* (2013.01); *C08G 77/80* (2013.01); *C08K 5/56* (2013.01)

(58) Field of Classification Search
CPC ......... C08L 83/04; C08G 77/12; C08G 77/20; C08G 77/80
See application file for complete search history.

(56) References Cited

U.S. PATENT DOCUMENTS

| | | | |
|---|---|---|---|
| 4,546,164 A | 10/1985 | Shen et al. | |
| 2013/0012087 A1* | 1/2013 | Itoh ........................ | C08J 5/249 |
| | | | 428/447 |
| 2013/0145966 A1 | 6/2013 | Schildbach et al. | |
| 2014/0228589 A1 | 8/2014 | Stepp et al. | |
| 2014/0296556 A1 | 10/2014 | Stepp et al. | |
| 2017/0166595 A1 | 6/2017 | Stepp et al. | |
| 2017/0190911 A1* | 7/2017 | Iimura ................... | C08L 83/00 |

FOREIGN PATENT DOCUMENTS

| | | |
|---|---|---|
| EP | 0110370 B1 | 4/1987 |
| JP | 2011246680 A | 12/2011 |
| WO | 2012022544 A1 | 2/2012 |
| WO | 2013041385 A1 | 3/2013 |
| WO | 2013075969 A1 | 5/2013 |
| WO | 2014065432 A1 | 5/2014 |
| WO | 2016001154 A1 | 1/2016 |

* cited by examiner

*Primary Examiner* — Alicia Bland
(74) *Attorney, Agent, or Firm* — BROOKS KUSHMAN P.C.

(57) ABSTRACT

Hydrosilylative crosslinking compositions containing an aliphatically unsaturated compound which is the reaction product of an alkali metal siliconate and a chlorosilane and a coupler having two silicon bond hydrogen atoms have high compression and damping characteristics when cured.

10 Claims, No Drawings

CROSSLINKABLE ORGANOPOLYSILOXANE COMPOSITIONS

CROSS REFERENCE TO RELATED APPLICATIONS

This application is the U.S. National Phase of PCT Appln. No. PCT/EP2018/072356 filed Aug. 17, 2018, the disclosure of which is incorporated in its entirety by reference herein.

BACKGROUND OF THE INVENTION

1. Field of the Invention

The invention relates to hydrosilylation-crosslinkable organopolysiloxane compositions, to processes for the production thereof and to the use thereof and vulcanizates obtainable therefrom.

2. Description of the Related Art

Organopolysiloxane resins containing reactive units having aliphatic carbon-carbon multiple bonds may be crosslinked with suitable couplers having two reactive SiH functions or with crosslinkers having at least three reactive SiH functions in the presence of—usually platinum-containing—catalysts by hydrosilylation/addition reaction. The advantage of vulcanized organopolysiloxane resins compared to organic systems, such as unsaturated polyester resins or epoxy resins, is their characteristic of combining high UV resistance and high heat resistance. Organopolysiloxane resins moreover have low dielectric constants and good stability toward chemicals. For these reasons, organopolysiloxane resins are used, for example, as a potting compound for the production of electrical or electronic components, particularly in the production of optical semiconductor elements such as high-performance LEDs (Light Emitting Devices), as insulation material, for example in traction motors for securing the windings and for filling the cavities between the turns, and also as a coating material. By using fibers, reinforcing fillers or modifiers, the mechanical properties, strength or fracture toughness can be optimized in order to expand the possible uses of addition-crosslinking organopolysiloxane resin compositions for applications in which higher demands on strength or durability are required. However, the vulcanized networks of organopolysiloxane resins are generally more brittle compared to organic systems, which can be attributed to a lower ductility, i.e. to low flow characteristics of the polymer network. The low flow characteristics and the consequent relatively low fracture toughness of the material are also identifiable in a compression test curve by a high value for the flow ratio. In addition, such brittle materials typically also exhibit an inhomogeneous polymer network and accordingly unfavorable damping characteristics identifiable in a tan delta measurement curve in a dynamic mechanical analysis (DMA) by a relatively high full width at half maximum and a relatively low height of the damping maximum tan $\delta_{max}$ at the glass transition temperature (Tg). A narrow and tall tan delta peak (=high damping) during glass transition by contrast indicates a relatively homogenous network which is generally observed in thermoplastic materials having a narrow molar weight distribution; however this is not customarily observed for a typical thermosetting material. Conversely, vulcanized networks of organopolysiloxane resins exhibiting better flow characteristics, i.e. a low value for the flow ratio and accordingly higher fracture toughnesses, tend to exhibit relatively low strengths, i.e. a low elastic modulus.

WO2016/001154 describes in its examples a simple method of producing cyclic siloxanes free from aromatic radicals by reaction of alkali siliconates or their condensation products.

The present invention accordingly has for its object to provide crosslinkable compositions with which vulcanizates of high strength, i.e. a high elastic modulus, coupled with a high fracture toughness manifesting in a small value for the flow ratio and a high and narrow damping maximum tan $\delta_{max}$ are obtainable.

SUMMARY OF THE INVENTION

The present invention provides hydrosilylation-crosslinkable compositions containing
- (A) aliphatically unsaturated organopolysiloxanes produced by reaction of
- (i) alkali metal salts of silanols (so-called alkali metal siliconates) of general formula

(II)

and/or condensation products thereof,
with the proviso that in component (i) the average molar ratio of alkali metal:silicon is 0.10 to 2.00, preferably 0.10 to 1.50, particularly preferably 0.40 to 1.00, in particular 0.50 to 0.90,
with (ii) chlorosilanes of general formula

(III), wherein
M represents alkali metal cation,
R and $R^7$ independently of one another may be identical or different and represent alkyl radicals,
$R^8$ may be identical or different and represents monovalent hydrocarbon radicals having aliphatic carbon-carbon multiple bonds,
$R^1$ and $R^9$ independently of one another may be identical or different and represent aromatic hydrocarbon radicals free from aliphatic carbon-carbon multiple bonds,
a is 0 or 1,
b is 0 or 1, with the proviso that a+b=1,
p is 1, 2 or 3, preferably 1 or 2, particularly preferably 1,
r is 0, 1, 2 or 3, preferably 1 or 2, and
t is 0, 1 or 2, with the proviso that r+t=2,
with the proviso that siliconate component (i) and/or the chlorosilanes (ii) of formula (III) comprise at least one aromatic hydrocarbon radical free from an aliphatic carbon-carbon multiple bond,
- (B) organosilicon compounds having two Si-bonded hydrogen atoms and
- (C) catalyst which promotes addition of Si-bonded hydrogen onto an aliphatic multiple bond.

DETAILED DESCRIPTION OF THE PREFERRED EMBODIMENTS

In the context of the present invention, the term organopolysiloxanes is intended to encompass polymeric, oligomeric and also dimeric siloxanes.

The radicals R and $R^7$ are preferably methyl, n-butyl, n-octyl, ethylhexyl, 2,2,4-trimethylpentyl or 2,4,4-trimethylpentyl, more preferably methyl.

The radical $R^8$ is preferably vinyl or 2-propenyl, more preferably vinyl.

The radicals $R^1$ and $R^9$ are, preferably independently of one another, phenyl, o-, m- and p-tolyl or benzyl, more preferably phenyl.

The alkali metal cation M is preferably lithium, sodium, potassium or cesium, more preferably sodium or potassium.

The component (i) employed according to the invention may be pure silanes of formula (II) or condensation products of silanes of formula (II) or a mixture of silanes of formula (II) and condensation products thereof, wherein the component (i) employed according to the invention (i) preferably consists predominantly of condensation products of silanes of formula (II). Component (i) employed according to the invention especially consists to an extent of more than 90% by weight, preferably more than 95% by weight, most preferably more than 99% by weight, and in particular to an extent of 100% by weight, of condensation products of silanes of formula (II).

Examples of component (i) employed according to the invention are $[PhSiO_{2/2}(OM)]_4$, $[PhSiO_{2/2}(OM)]_3$, $[Ph(OH)_{1.50}SiO_{1/2}(OM)_{0.50}]_2$, $[Ph(OH)_{1.35}SiO_{1/2}(OM)_{0.65}]_2$, $[Ph(OH)SiO_{1/2}(OM)]_2$, $Ph(OH)_{2.35}Si(OM)_{0.65}$, $[Me(OH)_{1.35}SiO_{1/2}(OM)_{0.65}]_2$, $[Me(OH)SiO_{1/2}(OM)]_2$, $Me(OH)_{2.3}Si(OM)_{0.7}$, $Me(OH)_{2.5}Si(OM)_{0.5}$, $[(Me(OH)SiO_{2/2})_2(MeSiO_{2/2}(OM))_2]$, $[Me(OH)_{1.5}SiO_{1/2}(OM)_{0.5}]_2$, $[Me(OH)_{1.35}SiO_{1/2}(OM)_{0.65}]_2$, $Me(OH)_{1.80}Si(OM)_{1.20}$, $Me(OH)_{0.30}SiO_{2/2}(OM)_{0.70}$, $[MeSiO_{2/2}(OM)]_4$, $[MeSiO_{2/2}(OM)]_3$ and $[(Me(OH)O_{1/2}(OM))_{0.58}(Ph(OH)SiO_{1/2}(OM))_{0.42}]$, wherein Me is methyl, Ph is phenyl and M is sodium or potassium, and also the commercially available product SILRES® BS Pulver S from Wacker Chemie AG, Munich, Germany.

Component (i) employed according to the invention is preferably solid at 20° C. and 1013 hPa, and are preferably water-soluble under these conditions.

Siliconate component (i) employed according to the invention is a commercially available product or is producible by processes commonly used in chemistry, such as described for example in WO2013/041385, WO2013/075969 and 2012/022544.

Examples of the chlorosilanes (ii) employed according to the invention are $Me_2ViSiCl$, $MeViPhSiCl$, $ViPh_2SiCl$, $Me_2BchSiCl$ and $Me_2DcpSiCl$, wherein $Me_2ViSiCl$ is preferred, where Me is methyl, Vi is vinyl, Bch is bicycloheptenyl, Dcp is 3a,4,5,6,7,7a-hexahydro-4,7-methano-1H-indenyl and Ph is phenyl.

The chlorosilanes (ii) are commercially available products or are producible by processes commonly used in chemistry.

The chlorosilanes (ii) employed according to the invention are preferably liquid at 20° C. and 1013 hPa.

The production of component (A) employed according to the invention by preference employs 1.0 to 20.0 mol equivalents, more preferably 1.0 to 10.0 mol equivalents, yet more preferably 1.0 to 5.0 mol equivalents, and in particular, 1.0 to 3.0 mol equivalents of chlorosilanes (ii) per mol equivalent of siliconate component (i).

Production of the organopolysiloxanes (A) according to the invention preferably employs organic solvent (iii).

Examples of optionally employed solvents (iii) are the examples recited below for solvent (F), preferably ethers or saturated hydrocarbons, most preferably methyl tert-butyl ether, the commercially available product ISOPAR™ E from ExxonMobil or n-hexane.

Production of the organopolysiloxanes (A) according to the invention is preferably carried out with water very largely excluded from the ambient atmosphere, as may be realized for example by blanketing with dry air, preferably having a dew point at 1013 hPa of below 0° C., or protective gas, for example nitrogen.

Production of the organopolysiloxanes (A) employed according to the invention is preferably carried out by addition of the component (i) to the chlorosilanes (ii) or by addition of the chlorosilanes (ii) to the component (i) in such a way that at least one component is in a solvent (iii) in liquid or in dissolved or suspended form; more preferably, both components (i) and (ii) are in a solvent in liquid or in dissolved or suspended form.

An auxiliary base (iv) may be added to scavenge the hydrogen chloride formed during the reaction according to the invention. Basic salts or nitrogen-containing compounds such as amines, ureas, imines, imidazoles, guanidines or amidines may be used as auxiliary base (iv). Examples of basic salts (iv) are sodium carbonate, sodium hydrogen carbonate, potassium carbonate, potassium hydrogen carbonate, calcium carbonate, calcium hydrogen carbonate, calcium oxide, magnesium carbonate and magnesium oxide. Examples of nitrogen-containing compounds (iv) are ammonia, ethylamine, butylamine, trimethylamine, triethylamine, tributylamine, urea, tetramethylurea, guanidine, tetramethylguanidine, 1,8-diazabicyclo[5.4.0]undec-7-ene, N-methylimidazole, N-ethylimidazole, piperidine, pyridine and picoline.

When nitrogen-containing compounds (iv) are employed for producing the organopolysiloxanes (A) employed according to the invention, these are preferably such compounds in which the nitrogen atoms bear no N-bonded hydrogen atom.

When auxiliary bases (iv) are employed for producing the organopolysiloxanes (A) according to the invention, the ratio of mol equivalents of auxiliary base (iv) to chlorosilane (ii) is preferably 1 to 1.5:1. It is preferable when no auxiliary bases are employed for producing the organopolysiloxanes (A) according to the invention.

When auxiliary base (iv) is employed, this is preferably initially charged with component (i) or the components (i) and (ii) are added simultaneously with the auxiliary base (iv), wherein the auxiliary base (iv) may optionally be initially charged in solvent (iii).

After termination of the reaction of component (i) with chlorosilanes (ii), the mixtures may be used directly after removal of the volatile components, any chloride salts formed and the optionally employed solvents (iii). If required, the resulting hydrogen chloride, the alkali metal chloride salts, optionally the chloride salts of the auxiliary bases (iv) and the excess of chlorosilanes (ii) may be washed out with water, wherein the volatile constituents, any employed solvents (iii) and excess chlorosilanes (ii) are advantageously initially distilled off to recover unreacted chlorosilanes (ii).

The component (A) employed according to the invention is preferably a mixture of different organopolysiloxanes at least partially containing cyclic organosiloxanes.

The organopolysiloxanes (A) employed according to the invention preferably have an average of 9 to 25, more preferably an average of 9 to 20, and in particular 9 to 15, silicon atoms.

The organopolysiloxanes (A) employed according to the invention are by preference those having the average formula $$[R_a R^1_b SiO_{3/2}]_m [R^7_r R^8 R^9_t SiO_{1/2}]_n \qquad (I),$$

wherein R, $R^1$, $R^7$, $R^8$, $R^9$, a, b, r and t are as defined above and m is ≥0.50 and ≤0.70 and n is ≥0.30 and ≤0.50, with the proviso that in formula (I) the sum of b+t≠0 and the sum of m+n is 1.

In the organopolysiloxanes (A) of average formula (I), the ratio n:m is preferably 0.40 to 1.00, more preferably 0.40 to 0.80, and in particular 0.45 to 0.70.

The organopolysiloxanes (A) employed according to the invention are preferably those having the average formula $$[R_a R^1_b SiO_{3/2}]_m [Me_r R^8 R^9_t SiO_{1/2}]_n \quad (I'),$$

wherein R, $R^1$, $R^8$, $R^9$, a, b, r, t, m and n are as defined above and Me is methyl, with the proviso that the ratio n:m is in the range 0.40 to 1.00 and that in formula (I') the sum b+t≠0 and the sum m+n is 1.

The organopolysiloxanes (A) employed according to the invention are more preferably those having an average formula selected from

[PhSiO$_{3/2}$]$_m$[MeR$^8$PhSiO$_{1/2}$]$_n$ where n:m=0.40 to 1.00,
[MeSiO$_{3/2}$]$_m$[MeR$^8$PhSiO$_{1/2}$]$_n$ where n:m=0.40 to 1.00,
[PhSiO$_{3/2}$]$_m$[Me$_2$R$^8$SiO$_{1/2}$]$_n$ where n:m=0.40 to 1.00 and
[MeSiO$_{3/2}$]$_m$[Ph$_2$R$^8$SiO$_{1/2}$]$_n$ where n:m=0.40 to 1.00,
wherein $R^8$, m and n are as defined above and Me is methyl and Ph is phenyl.

The organopolysiloxanes (A) employed according to the invention are especially those having an average formula selected from

[PhSiO$_{3/2}$]$_m$[MeViPhSiO$_{1/2}$]$_n$ where n:m=0.40 to 1.00,
[MeSiO$_{3/2}$]$_m$[MeViPhSiO$_{1/2}$]$_n$ where n:m=0.40 to 1.00 and
[PhSiO$_{3/2}$]$_m$[Me$_2$ViSiO$_{1/2}$]$_n$ where n:m=0.40 to 1.00,
wherein Me is methyl, Ph is phenyl and Vi is vinyl.

In the component (A) employed according to the invention, the proportion of cyclic organopolysiloxanes of formula (I), i.e. those of formula $(R_a R^1_b Si(OSiR^7_r R^8 R^9_t)O_{2/2})_3$ or $(R_a R^1_b Si(OSiR^7_r R^8 R^9_t)O_{2/2})_4$ where R, $R^1$, $R^7$, $R^8$, $R^9$, a, b, r and t are as defined above, based on the sum of the organopolysiloxanes (A) of formula (I), is not more than 0.80, preferably not more than 0.60, more preferably not more than 0.40, and in particular not more than 0.30.

The organopolysiloxanes (A) employed according to the invention and produced by process A may still be in admixture with unreacted reactants (i) and (ii), disiloxane resulting from the hydrolysis and dimerization of chlorosilanes (ii), for example non-volatile 1,3-dimethyl 1,3-diphenyl-1,3-divinyldisiloxane, wherein preferably the content of unconverted reactants (i) and (ii) is less than 0.5% by weight and the content of disiloxanes is less than 5% by weight.

The organopolysiloxanes (A) employed according to the invention have a weight-average molar mass Mw by preference of 900 to 3000 g/mol, more preferably of 900 to 2500 g/mol, yet more preferably of 1000 to 2400 g/mol, and in particular of 1000 to 2000 g/mol.

The organopolysiloxanes (A) employed according to the invention have a number-average molar mass Mn by preference of 800 to 2000 g/mol, more preferably of 800 to 1500 g/mol, yet more preferably of 850 to 1400 g/mol, and in particular of 900 to 1200.

The organopolysiloxanes (A) employed according to the invention have polydispersities Mw/Mn of 1.0 to 3.5, by preference of 1.0 to 2.5, more preferably of 1.1 to 2.3, yet more preferably of 1.1 to 2.0, and in particular of 1.1 to 1.4.

Examples of the organopolysiloxanes (A) employed according to the invention are

[(PhSi(OSiViMe$_2$)O$_{2/2}$)$_4$]$_{0.23}$(PhSiO$_{3/2}$)$_{0.50}$(ViMe$_2$SiO$_{1/2}$)$_{0.27}$,
where Mw is 1070 g/mol, Mn=930 g/mol, Mw/Mn=1.15;

[(PhSiO$_{3/2}$)$_4$(ViMe$_2$SiO$_{1/2}$)$_4$]$_{0.16}$(PhSiO$_{3/2}$)$_{0.49}$(ViMe$_2$SiO$_{1/2}$)$_{0.19}$,
where Mw is 1180 g/mol, Mn=1055 g/mol, Mw/Mn=1.12;

(PhSiO$_{3/2}$)$_{0.69}$(ViMe$_2$SiO$_{1/2}$)$_{0.31}$,
where Mw=1310 g/mol, Mn=1160 g/mol and Mw/Mn=1.13;

(MeSiO$_{3/2}$)$_{0.63}$(ViMePhSiO$_{1/2}$)$_{0.37}$,
where Mw=1150 g/mol, Mn=900 g/mol and Mw/Mn=1.28;

[(ViMePhSiO$_{1/2}$)$_2$]$_{0.05}$ [(MeSi(OSiViMePh)O$_{2/2}$)$_4$]$_{0.30}$ (MeSiO$_{3/2}$)$_{0.30}$(ViMePhSiO$_{1/2}$)$_{0.15}$,
where Mw=1020 g/mol, Mn=690 g/mol and Mw/Mn=1.47;

(PhSiO$_{3/2}$)$_{0.72}$(ViMePhSiO$_{1/2}$)$_{0.28}$,
where Mw=2660 g/mol, Mn=1900 g/mol and Mw/Mn=1.40, (PhSiO$_{3/2}$)$_{0.63}$(ViMePhSiO$_{1/2}$)$_{0.37}$,
where Mw=2410 g/mol, Mn=1460 g/mol and Mw/Mn=1.65,

[(ViMePhSiO$_{1/2}$)$_2$]$_{0.11}$[(PhSiO$_{3/2}$)$_3$]$_{0.23}$[(PhSiO$_{3/2}$)$_4$]$_{0.33}$ (ViMePhSiO$_{1/2}$)$_{0.33}$,
where Mw=2370 g/mol, Mn=1080 g/mol and Mw/Mn=2.20, wherein Me is methyl, Vi is vinyl and Ph is phenyl.

The component (B) employed according to the invention may be selected from any desired and hitherto known organosilicon compounds comprising two Si-bonded hydrogen atoms, for example SiH-functional silanes and siloxanes.

Coupler (B) is preferably an organosilicon compound containing units of formula $$R^4_e H_f R^5_g SiO_{(4-e-f-g)/2} \quad (IV),$$

wherein $R^4$ may be identical or different and represents a monovalent or divalent, SiC-bonded, optionally substituted, aliphatically saturated hydrocarbon radical, $R^5$ may be identical or different and represents a monovalent or divalent, SiC-bonded, optionally substituted, aliphatically saturated aromatic hydrocarbon radical, e is 0, 1, 2 or 3, preferably 0, 1 or 2, particularly preferably 1 or 2, f is 0, 1 or 2, preferably 1 or 2, and g is 0, 1 or 2, preferably 1 or 2, with the proviso that e+f+g≤4 and two Si-bonded hydrogen atoms are present per molecule.

Couplers (B) preferably contain per molecule at least one radical $R^5$, more preferably 1 to 4, in particular 1 to 2, radicals $R^5$.

Couplers (B) preferably contain per molecule at least one radical $R^5$ which is a divalent, SiC-bonded, aliphatically saturated aromatic hydrocarbon radical which in particular connects two units of formula (IV) to one another.

Examples of radicals $R^4$ are alkyl radicals such as methyl, ethyl, n-propyl, iso-propyl, 1-n-butyl, 2-n-butyl, iso-butyl, tert-butyl, n-pentyl, iso-pentyl, neo-pentyl, and tert-pentyl radicals; hexyl radicals such as the n-hexyl radical; heptyl radicals such as the n-heptyl radical; octyl radicals such as the n-octyl radical and iso-octyl radicals such as the 2,4,4-trimethylpentyl radical and the 2,2,4-trimethylpentyl radical; nonyl radicals such as the n-nonyl radical; decyl radicals such as the n-decyl radical; dodecyl radicals such as the n-dodecyl radical; hexadecyl radical such as the n-hexadecyl radical; octadecyl radicals such as the n-octadecyl radical; cycloalkyl radicals, such as the cyclopentyl, cyclohexyl, cycloheptyl and methylcyclohexyl radicals, and also the methylene, ethylene, dimethylmethylene and methylmethylene radicals, preferably the methyl radical.

Examples of radicals $R^5$ are aryl radicals such as the phenyl, biphenyl, naphthyl, anthryl and phenanthryl radicals; alkaryl radicals such as o-, m-, p-tolyl radicals xylyl radicals and ethylphenyl radicals; and aralkyl radicals such as the benzyl radical, and the α- and the β-phenylethyl radicals, the 2-(2-methylphenyl)ethyl radical, the 2-(3-methylphenyl)ethyl radical and the 2-(4-methylphenyl)ethyl radical, the 2-phenylpropenyl radical and the 2-phenylisopropenyl radical, and also the phenylene and methyl(phenyl)methylene radicals, phenylmethylene and diphenylmethylene radicals, —($C_6H_4$)—$CH_2$—($C_6H_4$)—, —($C_6H_4$)—C($CH_3$)$_2$—($C_6H_4$)—, —($C_6H_4$)—C($CH_3$)H—($C_6H_4$)—, —($C_6H_4$)—C($C_6H_5$)H—($C_6H_4$)—, —($C_6H_4$)—C($C_6H_5$)Me-($C_6H_4$)—, —($C_6H_4$)—C($C_6H_5$)$_2$—($C_6H_4$)—, —($C_6H_4$)—O—($C_6H_4$)—, —($C_6H_4$)—S—($C_6H_4$)—, and also divalent biphenyl, naphthalene, anthracene or phenanthrene radicals, wherein the phenyl radical, the divalent biphenyl radical or the phenylene radical are preferred.

Examples of couplers (B) are phenylsilanes, such as diphenylsilane (CAS 775-12-2), methyl(phenyl)silane (CAS 766-08-5); couplers having siloxane units, such as 1,3-dimethyl-1,3-diphenyldisiloxane (CAS 6689-22-1), 1,1,3-trimethyl-3-phenyldisiloxane, 1,5-dimethyl-1,3,3,5-tetraphenyltrisiloxane, 1,1,3,3-tetraphenyldisiloxane, 1,1,5,5-tetramethyl-3,3-diphenyltrisiloxane, 1,1,3,5,5-pentamethyl-3-phenyltrisiloxane, couplers having phenylene and divalent biphenyl units, such as 1,4-bis(dimethylsilyl)benzene (CAS 2488-01-9), 1,4-bis(methylphenylsilyl)benzene, 4,4'-bis(dimethylsilyl)-1,1'-biphenyl, bis(4'-(dimethylsilyl)-[1,1'-biphenyl]-4-yl)dimethylsilane, 4,4'-bis(methylphenylsilyl)-1,1'-biphenyl, bis(4-(dimethylsilyl)phenyl)dimethylsilane, bis(4-(dimethylsilyl)phenyl) (ethyl)methylsilane, bis(4-(dimethylsilyl)phenyl)diethylsilane, bis(4-(dimethylsilyl)phenyl)di-n-butylsilane, bis(4-(dimethylsilyl)phenyl)di-tert-butylsilane, bis(4-(dimethylsilyl)phenyl)dipropylsilane, bis(4-(dimethylsilyl)phenyl) di-iso-propylsilane, bis(4-(dimethylsilyl)phenyl)methane, 2,2-bis(4-(dimethylsilyl)phenyl)propane; couplers comprising divalent polycyclic aromatic hydrocarbons, such as 9,10-bis(dimethylsilyl)anthracene, 1,4-bis(dimethylsilyl)naphthalene, 1,5-bis(dimethylsilyl)naphthalene, 2,6-bis(dimethylsilyl)naphthalene, 1,8-bis(dimethylsilyl)naphthalene, 1,6-bis(dimethylsilyl)naphthalene, 1,7-bis(dimethylsilyl)naphthalene; and bis(4-(dimethylsilyl)phenyl) ether and bis(4-(dimethylsilyl)phenyl)sulfide.

Coupler (B) is preferably diphenylsilane, 1,3-dimethyl-1,3-diphenyldisiloxane, 1,1,5,5-tetramethyl-3,3-diphenyltrisiloxane, 1,4-bis(dimethylsilyl)benzene, 4,4'-bis(dimethylsilyl)-1,1'-biphenyl, bis(4'-(dimethylsilyl)-[1,1'-biphenyl]-4-yl)dimethylsilane, bis(4-(dimethylsilyl)phenyl)dimethylsilane, bis(4-(dimethylsilyl)phenyl)methane, bis(4-(dimethylsilyl)phenyl) ether or bis(4-(dimethylsilyl)phenyl)sulfide.

Coupler (B) is more preferably diphenylsilane, 1,4-bis(dimethylsilyl)benzene, 1,3-dimethyl-1,3-diphenyldisiloxane, 4,4'-bis(dimethylsilyl)-1.1'-biphenyl or bis(4-(dimethylsilyl)phenyl)dimethylsilane, especially 1,4-bis(dimethylsilyl)benzene, 4,4'-bis(dimethylsilyl)-1,1'-biphenyl, 1,3-dimethyl-1,3-diphenyldisiloxane or bis(4-dimethylsilylphenyl)dimethylsilane.

Coupler (B) is selected from commercially available products or may be produced by processes commonly used in chemistry, for example by Grignard reaction.

In the compositions according to the invention, components (A) and (B) are employed in amounts such that the molar ratio of Si-bonded hydrogen to aliphatically unsaturated carbon-carbon multiple bonds is by preference 0.80 to 1.20, more preferably 0.85 to 1.10, yet more preferably 0.90 to 1.10, and in particular 0.95 to 1.05.

Employable catalysts (C) include all catalysts that are useful for addition of Si-bonded hydrogen onto aliphatic multiple bonds.

Examples of catalysts (C) are metals such as platinum, rhodium, palladium, ruthenium and iridium, preferably platinum, which may optionally be fixed on finely divided support materials, such as activated carbon, aluminum oxide or silicon dioxide.

Preferably employed as catalyst (C) are platinum and compounds and complexes thereof.

Examples of such platinum catalysts (C) are metallic and finely divided platinum, which may be arranged on supports, such as silicon dioxide, aluminum oxide or activated carbon, compounds or complexes of platinum, such as platinum halides, for example $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, in particular platinum-divinyltetramethyldisiloxane complexes with or without a content of detectable inorganically bonded halogen, bis(gamma-picoline)platinum dichloride, trimethylenedipyridineplatinum dichloride, dicyclopentadieneplatinum dichloride, dimethylsulfoxidethyleneplatininum(II) dichloride and also reaction products of platinum tetrachloride with olefin and primary amine or secondary amine or primary and secondary amine, such as the reaction product of platinum tetrachloride dissolved in 1-octene with sec-butylamine, or ammonium-platinum complexes according to EP-B 110 370 and platinum complexes with N-heterocyclic carbenes (NHC) such as [1,3-bis(2,6-diisopropylphenyl)imidazol-2-ylidene][1,3-divinyl-1,1,3,3-tetramethyldisiloxane]platinum(0) (CAS 849830-54-2), [1,3-bis(2,6-diisopropylphenyl)imidazolidinylidene][1,3-divinyl-1,1,3,3-tetramethyldisiloxane]platinum(0) (CAS 873311-51-4), [1,3-bis(cyclohexyl)imidazol-2-ylidene][1,3-divinyl-1,1,3,3-tetramethyldisiloxane]platinum(0) (CAS 400758-55-6), 1,3-bis(2,4,6-trimethylphenyl)-3,4,5,6-tetrahydropyrimidin-1-iumplatinum(divinyltetramethyldisiloxane), 1,3-bis(2,6-dimethylphenyl)-3,4,5,6-tetrahydropyrimidin-1-iumplatinum(divinyltetramethyldisiloxane) and 1,3-bis(2-methylphenyl)-3,4,5,6-tetrahydropyrimidin-1-iumplatinum(divinyltetramethyldisiloxane).

Preferably employed as catalyst (C) is the platinum-1,3-divinyl-1,1,3,3-tetramethyldisiloxane complex (CAS 68478-92-2) which has long been known as Karstedt's catalyst in the literature.

Catalyst (C) is employed in the preparations according to the invention by preference in amounts of 1 to 5000 ppm by weight (parts by weight per million parts by weight), preferably in amounts of 1 to 2000 ppm by weight, and in particular in amounts of 1 to 500 ppm by weight, in each case calculated as elemental metal, preferably elemental platinum, and based on the total weight of the components (A) and (B).

As catalyst (C), the preparations according to the invention very preferably employ Karstedt's catalyst (CAS 68478-92-2) in amounts of 5 to 100 ppm by weight, calculated as elemental platinum and based on the total weight of the components (A) and (B).

In a preferred embodiment, catalyst (C) is used in admixture with inhibitor (D).

In addition to the components (A), (B) and (C), the compositions according to the invention may contain further substances distinct from components (A), (B) and (C), such as for example inhibitors (D), additives (E) and organic solvents (F).

The compositions according to the invention may contain inhibitors (D) including those which have also hitherto been used in hydrosilylation-crosslinkable compositions and retard the addition of Si-bonded hydrogen onto aliphatic carbon-carbon multiple bonds at room temperature or which may be used to specifically adjust the processing time and crosslinking rate.

Examples of optionally employed inhibitors (D) are acetylenic alcohols, such as 1-ethynylcyclohexan-1-ol, 3,5-dimethyl-1-hexyn-3-ol, 2-phenyl-3-butyn-2-ol and 2-methyl-3-butyn-2-ol, polymethylvinylcyclosiloxanes, such as tetramethyl-tetravinylcyclotetrasiloxane, linear vinyl-terminated polydimethylsiloxanes, trialkylcyanurates, maleates, such as diallyl maleate, dimethyl maleate and bis(2-methoxy-1-methylethyl)maleate, alkyl fumarates such as diethyl fumarate and diallyl fumarate, organic hydroperoxides, such as cumene hydroperoxide, tert-butyl hydroperoxide and pinane hydroperoxide, organic peroxides, organic sulfoxides, organic amines and amides, phosphines and phosphites, phosphonites, phosphinites, nitriles, diaziridines and oximes and also alkylthioureas, thiuram monosulfides and disulfides.

Preferred examples of optionally employed inhibitors (D) are acetylenic alcohols, such as 1-ethynylcyclohexan-1-ol, 3,5-dimethyl-1-hexyn-3-ol, 2-phenyl-3-butyn-2-ol and 2-methyl-3-butyn-2-ol, polymethylvinylcyclosiloxanes, such as tetramethyl-tetravinylcyclotetrasiloxane, linear vinyl-terminated polydimethylsiloxanes, trialkylcyanurates, maleates, such as diallyl maleate, dimethyl maleate and bis(2-methoxy-1-methylethyl)maleate, alkyl fumarates such as diethyl fumarate and diallyl fumarate, organic hydroperoxides, such as cumene hydroperoxide, tert-butyl hydroperoxide and pinane hydroperoxide, organic peroxides, phosphines and phosphites, phosphonites, phosphinites, diaziridines and oximes and also alkylthioureas, thiuram monosulfides and disulfides.

The optionally employed inhibitors (D) are more preferably 1-ethynylcyclohexan-1-ol or thiuram monosulfides, in particular thiuram monosulfides.

When inhibitor (D) is employed, it is preferably employed in amounts of 5 to 5000 ppm by weight, more preferably of 10 to 2000 ppm by weight, and in particular of 20 to 1000 ppm by weight, in each case based on the total weight of the components (A) and (B). The compositions according to the invention preferably contain inhibitor (D).

The addition-crosslinking composition according to the invention may be adjusted such that after combining all of the individual components forming said composition at temperatures of −50° C. to 30° C. the composition is storage-stable over relatively long periods, in particular several weeks to at least 2 months, preferably up to at least 3 months, more preferably up to at least 4 months, and in particular up to at least 5 months. It is likewise possible to adjust the preparations according to the invention such that after combining all of the components forming said composition only a limited working time (potlife) until onset of curing remains. This is achieved either by adding no inhibitor or for example by adding a component (D) which has a less pronounced inhibiting effect on the addition reaction, for example acetylenic alcohols, such as 1-ethynylcyclohexan-1-ol.

Component (E) optionally employed according to the invention is preferably selected from plasticizers, adhesion promoters, soluble dyes, inorganic and organic pigments, fluorescent dyes, fungicides, fragrances, dispersing agents, rheology additives, corrosion inhibitors, oxidation inhibitors, light stabilizers, heat stabilizers, flame-retarding agents, agents for influencing tack, agents for influencing electrical properties, agents for improving thermal conductivity; modifiers for increasing strength, glass transition temperature and/or fracture toughness; reinforcing and non-reinforcing fillers; and also fiber fabrics made of glass, carbon or plastic; or combinations thereof.

When the compositions according to the invention contain component (E), the amounts employed are in each case preferably 0.1 to 200 parts by weight, particularly preferably 0.1 to 100 parts by weight, in particular 0.1 to 50 parts by weight, in each case based on 100 parts by weight of the sum of the components (A) and (B).

Examples of optionally used solvent (F) are ketones such as methyl isobutyl ketone, methyl ethyl ketone, methyl isoamyl ketone, diisobutyl ketone, acetone, cyclohexanone, diethyl ketone, 2-hexanone, acetylacetone and butane-2,3-dione; esters such as ethyl acetate, ethylene glycol diacetate, gamma-butyrolactone, 2-methoxypropyl acetate (MPA), di(propylene glycol) dibenzoate and ethyl(ethoxy) propionate, methyl acetoacetate, ethyl acetoacetate, n-butyl acetoacetate, methyl acetate, n-, sec- or tert-butyl acetate, butyl 2-hydroxypropionate, ethyl propionate, ethyl 2-hydroxypropionate and dimethyl maleate; amides such as N,N-dimethylformamide, N,N-dimethylacetamide, N-methyl-2-pyrrolidone and N-ethyl-2-pyrrolidone; nitriles such as acetonitrile, propionitrile, 3-methoxypropionitrile; acetals such as methylal, ethylhexylal, butylal, 1,3-dioxolane, 1,3,5-trioxane and glycerol formal; ethers such as methyl tert-butyl ether, tetrahydrofuran (THF), diphenyl ether, allylphenyl ether, benzylphenyl ether, cyclohexylphenyl ether, methylphenyl ether, tetrahydropyran, 4-methyltetrahydropyran, butylphenyl ether, dibenzyl ether, anisole, 2-methyltetrahyrofuran, cyclopentyl methyl ether, dibutyl ether, diethyl ether, mono-, di-, tri- or tetraethylene glycol dimethyl ether, ethylene glycol dibutyl ether, ethyl methyl ether and 1,4-dioxane; sulfoxides such as dimethyl sulfoxide, dipropyl sulfoxide and dibutyl sulfoxide; saturated hydrocarbons such as n-pentane, n-hexane, cyclohexane, n-heptane, n-octane and isomeric octanes, such as 2-ethylhexane, 2,4,4-trimethylpentane, 2,2,4-trimethylpentane and 2-methylheptane, and also mixtures of saturated hydrocarbons having boiling ranges between 60-300° C., such as are obtainable under the trade names Exxsol™, Isopar™, Hydroseal® or Shellsol®; aromatic hydrocarbons such as benzene, toluene, o-, m- or p-xylene, solvent naphtha and mesitylene; acetals such as methylal, ethylhexylal, butylal, 1,3-dioxolane and glycerol formal; carbonates such as 1,3-dioxolan-2-one, diethyl carbonate, dimethyl carbonate, dipropyl carbonate and propylene glycol carbonate, ethylene carbonate; chloroform; dichloromethane; disiloxanes and also linear or cyclic silicones bearing no aliphatic or aromatic radicals having carbon-carbon multiple bonds and no Si—H groups, such as hexamethyldisiloxane, octamethyltrisiloxane, octamethylcyclotetrasiloxane, decamethylcyclopentasiloxane and methyltris(trimethylsiloxy)silane; and also mixtures thereof.

Preferred optionally employed solvents (F) are ethers, aromatic hydrocarbons or saturated hydrocarbons.

When the compositions according to the invention contain solvent (F), the amounts employed are preferably 0.001 to 20 parts by weight, more preferably 0.01 to 10 parts by weight, in particular 0.1 to 5 parts by weight, in each case based on 100 parts by weight of the sum of the components (A) and (B). The compositions according to the invention preferably contain no solvent (F).

The compositions according to the invention are by preference those containing
(A) aliphatically unsaturated organopolysiloxanes produced by reaction of
component (i) with component (ii) optionally in the presence of organic solvent (iii) and optionally in the presence of an auxiliary base (iv), wherein the product mixture is preferably worked up in water, filtered and devolatilized,
(B) organosilicon compounds having two Si-bonded hydrogen atoms and
(C) catalyst which promotes addition of Si-bonded hydrogen onto aliphatic multiple bond,
optionally (D) inhibitor,
optionally (E) further constituents and
optionally (F) solvent.

The compositions according to the invention are more preferably those containing
(A) organopolysiloxane of formula $[R_aR^1_bSiO_{3/2}]_m$ $[Me_rR^8_sR^9_tSiO_{1/2}]_n$ (I') with b+t≠0 and a ratio n:m of 0.40 to 1.00,
(B) coupler having two reactive SiH units,
(C) catalyst,
(D) inhibitor,
optionally (E) further constituents and
optionally (F) solvent.

The compositions according to the invention are most preferably those containing
(A) organopolysiloxane of formula $[R_aR^1_bSiO_{3/2}]_m$ $[Me_rR^8_sR^9_tSiO_{1/2}]_n$ (I') with b+t≠0 and a ratio n:m of 0.40 to 1.00,
(B) coupler having two reactive SiH units and at least one radical $R^5$ which is a divalent, SiC-bonded, optionally substituted aliphatically saturated aromatic hydrocarbon radical,
(C) catalyst,
(D) inhibitor,
optionally (E) further constituents and
optionally (F) solvent.

The compositions according to the invention preferably contain no further constituents other than the components (A) to (F).

The components employed according to the invention may in each case be a single type of such a component or a mixture of at least two types of a respective component.

The compositions according to the invention composed of (A), (B) and (C) may be solid or liquid at 23° C. and 1013 hPa, preferably being liquid at 23° C. and 1013 hPa.

When the compositions according to the invention composed of (A), (B) and (C) are liquid at 23° C. and 1013 hPa, they preferably have a dynamic viscosity of more than 1 and less than 1,000,000 mPa·s, more preferably more than 10 and less than 500,000 mPa·s, especially more than 100 and less than 100,000 mPa·s, in each case at 23° C.

Production of the compositions according to the invention may be carried out according to known processes, such as for example by mixing the individual components in any desired sequence and in hitherto known fashion.

The present invention further provides a process for producing the compositions according to the invention by mixing the individual components.

In the process according to the invention, the mixing may be carried out at temperatures in the range from preferably 10° C. to 40° C. However, if desired, the mixing may also be carried out at higher temperatures, for example at temperatures in the range from 40° C. to 100° C., wherein an inhibitor (D) is preferably added to the composition. It is preferable to perform mixing at the temperature which results upon mixing at ambient temperature from the temperature of the raw materials plus the temperature increase due to the energy input during mixing, wherein heating or cooling may be performed as required.

The mixing may be carried out at ambient atmospheric pressure, i.e. about 900 to 1100 hPa. It is further possible to perform mixing temporarily or continuously under reduced pressure, for example at 30 to 500 hPa absolute pressure, to remove volatile compounds and/or air or to operate at elevated pressure, such as at pressures between 1100 hPa and 3000 hPa absolute pressure, in particular in continuous mode, when for example these pressures are brought about in closed systems by the pressure during pumping and by the vapor pressure of the employed materials at elevated temperatures.

The process according to the invention may be performed continuously, discontinuously or semicontinuously, but preferably discontinuously.

In a preferred embodiment of the process according to the invention for producing the compositions, the constituents (A), (B) and (C) and the optionally employed components (D), (E) and (F) are mixed in any desired sequence.

It is particularly preferable when the process according to the invention comprises premixing the components (A) and (B) and the optionally employed components (D), (E) and (F) in any desired sequence and then adding component (C), optionally as a mixture with component (D) or (F).

In a further particularly preferred embodiment, the process according to the invention comprises premixing the components (A) and (B) and the optionally employed components (E) and (F) in any desired sequence and then adding a mixture of components (C) and (D), optionally as a mixture with component (F).

In a further particularly preferred embodiment, the process according to the invention comprises premixing the component (A) and the optionally employed components (E) and (F) in any desired sequence and then adding a mixture of components (B) and (C), optionally employed component (D) and optionally employed component (F).

In a preferred embodiment, directly after the reaction of component (i) with chlorosilanes (ii), optionally in organic solvent (iii) and optionally in the presence of an auxiliary base (iv), component (A) is subjected to aqueous workup, devolatilized, and subsequently mixed with organosilicon component (B) and the optionally employed components (D), (E) and (F) in any desired sequence followed by addition of component (C), optionally as a mixture with component (D) or (F).

The mixtures according to the invention/produced according to the invention are preferably degassed before curing.

Crosslinking according to the invention is preferably carried out at temperatures in the range from 50° C. to 270° C., more preferably from 70° C. to 200° C., and especially from 140° C. to 200° C. The crosslinking according to the invention is most preferably initially carried out at temperatures of 100° C. to 200° C., followed by a post-curing step at 210° C. to 250° C.

The crosslinking according to the invention is preferably carried out at ambient atmospheric pressure, i.e. about 900 to 1100 hPa, but may also be carried out at elevated pressure, i.e. from 1200 hPa to 10 MPa.

The crosslinking according to the invention may be carried out in an air atmosphere or protective gas atmosphere, such as nitrogen or argon. The crosslinking according to the invention is preferably carried out at temperatures up to 220° C. in an air atmosphere and at temperatures above 220° C. in a protective gas atmosphere.

The present invention further relates to molded articles produced by crosslinking the compositions according to the invention.

The molded articles according to the invention preferably have an elastic modulus measured at 23° C. of more than 0.50 GPa, more preferably more than 0.80 GPa, and particularly more than 1.00 GPa.

The molded articles according to the invention preferably have a flexural strength $\sigma_{fM}$ measured at 23° C. of more than 15 MPa, more preferably more than 20 MPa, and particularly more than 25 MPa, especially more than 30 MPa.

The molded articles according to the invention by preference have a tan delta$_{max}$ of at least 0.400, more preferably of at least 0.500, yet more preferably of at least 0.600, and especially of at least 0.700.

The molded articles according to the invention by preference have a full width at half maximum, defined as the peak width at tan delta$_{max}$/2, of ≤25° C., more preferably ≤20° C., yet more preferably ≤17° C., and especially ≤15° C.

In compressive testing, measured at 25° C., the molded articles according to the invention preferably have a yield stress ay, defined as the stress at which for the first time an increase in compression is not accompanied by an increase in stress (see DIN EN ISO 604: 2003-12, chapter 3.3.1) and identifiable by a stress maximum in the stress/compressive strain curve (see DIN EN ISO 604: 2003-12, chapter 4, FIG. 1, curve a) followed by a drop in stress for further increases in compression after $\sigma_y$ (strain softening).

The molded articles according to the invention by preference have a flow ratio measured at 25° C. of less than 1.40, more preferably less than 1.30, yet more preferably less than 1.20, and especially less than 1.10.

The molded articles according to the invention have the advantage that they combine high strength, i.e. high elastic moduli and flexural strength values, with good flow characteristics, i.e. a low flow ratio $\sigma_{20\%}:\sigma_y$, and a homogeneous network structure, identifiable by a high damping maximum tan delta$_{max}$ at the glass transition temperature (Tg) and a low full width at half maximum.

The compositions according to the invention have the advantage that they are producible from readily available substances by commonly used processes.

The compositions according to the invention have the advantage that they are liquid and readily processable at a temperature of 23° C.

The process according to the invention has the advantage that it is easy to perform.

Viscosity Measurement

In the context of the present invention, the dynamic viscosity according to DIN 53019 is determined at a temperature of 23° C. and an air pressure of 1013 hPa, unless stated otherwise. Measurement is performed with an Anton Paar "Physica MCR 300" rotational rheometer. For viscosities of 1 to 200 mPa·s, a coaxial cylinder measurement system (CC 27) having a ring measurement slot of 1.13 mm is utilized while a cone-plate measurement system (Searle System with CP 50-1 measuring cone) is used for viscosities of greater than 200 mPa·s. The shear rate is adapted to the polymer viscosity (1 to 99 mPa·s at 100 s$^{-1}$; 100 to 999 mPa·s at 200 s$^{-1}$; 1000 to 2999 mPa·s at 120 s$^{-1}$; 3000 to 4999 mPa·s at 80 s$^{-1}$; 5000 to 9999 mPa·s at 62 s$^{-1}$; 10,000 to 12,499 mPa·s at 50 s$^{-1}$; 12,500 to 15,999 mPa·s at 38.5 s$^{-1}$; 16,000 to 19,999 mPa·s at 33 s$^{-1}$; 20,000 to 24,999 mPa·s at 25 s$^{-1}$; 25,000 to 29,999 mPa·s at 20 s$^{-1}$; 30,000 to 39,999 mPa·s at 17 s$^{-1}$; 40,000 to 59,999 mPa·s at 10 s$^{-1}$; 60,000 to 149,999 at 5 s$^{-1}$; 150,000 to 199,999 mPa·s at 3.3 s$^{-1}$; 200,000 to 299,999 mPa·s at 2.5 s$^{-1}$; 300,000 to 1,000,000 mPa·s at 1.5 s$^{-1}$.

After temperature-controlling the measurement system to the measurement temperature, a three-stage measurement program consisting of a run-in phase, a pre-shearing and a viscosity measurement is employed. The run-in phase is carried out by increasing the shear rate stepwise over one minute to the above-mentioned shear rate which is dependent on the expected viscosity at which the measurement is to be carried out. As soon as said temperature has been achieved, the pre-shearing is carried out at constant shear rate for 30 s before viscosity is determined from 25 individual measurements of 4.8 seconds each, from which the average value is determined. The average value corresponds to the dynamic viscosity which is reported in mPa·s.

Production of the Cylindrical Test Specimens

To perform the DMA, the flexural strength measurements and compressive measurements, the test specimens were produced from cylindrical vulcanizates. The cylindrical vulcanizates were produced in stainless steel tubes having length by internal diameter dimensions of 150 mm×10 mm, which were sealed on one side with a screwtop cap made of stainless steel. To prevent adhesion of the cyclosiloxane compositions, the inside of the screwtop contained a seal made of polytetrafluoroethylene; the inner surfaces of the stainless steel tubes were sparingly wetted with WACKER® SILICONE PASTE P using an appropriately sized test tube brush before filling with the organopolysiloxane compositions and subsequently stored at 180° C. for 2 hours. The tubes were then filled with the cyclosiloxane composition and cured in a recirculating air oven in a nitrogen atmosphere for 72 hours at 180° C. and for a further 2 hours at 250° C. The stainless steel tubes were stood upright with the open side pointing upward. The test specimens were then allowed to cool to 23° C. in the tubes before the test specimens were demolded. The uppermost 20 mm of the test specimen side which was uncovered during curing was discarded from further use.

Dynamic Mechanical Analysis (DMA)

Measurement Parameters:
  Instrument: ARES Rheometer (TA Instruments)
  Temperature range: −100° C.-300° C.
  Heating rate: 4 K/min with nitrogen purge
  Frequency: 1 Hz
  Strain: Initially 0.03%, automatically increased if measurement signal below threshold value For the investigations, rectangular test specimens having the dimensions length by width by height=40 mm×6 mm×3 mm were produced from the cylindrical test specimens; the resulting clamping length was 25 mm.

In the present document, tan delta corresponds to the damping, i.e. the tangent of the phase angle or the ratio of loss modulus G″ to storage modulus G′; tan delta$_{max}$ is defined as the damping maximum tan delta (=maximum value of the tangent delta curve) at the glass transition temperature Tg.

In the present document, the full width at half maximum is defined as the peak width of the tan delta curve in ° C. at tan delta$_{max}$/2.

The value for tan delta$_{max}$ reported in table 1 was rounded to the third decimal place and the value for the full width at half maximum was rounded to the nearest integer, in each case according to DIN 1333:1992-02 section 4.

Compression Test

In the context of the present invention, the compression properties (yield stress) were carried out according to the standard DIN EN ISO 604:2003-12.

Measurement Parameters:
Instrument: Instron 3369 testing system
Load cell: 50 kN
Compression piston 50 mm,
Test speed: 1 mm/min
Temperature: 25° C., 28% rel. humidity
Initial load: 40 N
Lubricant: none Sample preparation: For the investigations, cylindrical test specimens having a diameter of 9.5 mm and having a height of 17 mm were produced. The compression test was performed on 3 test specimens of a sample body. The sample bodies were compressed to about 4.5 mm compression, i.e. about 26% based on initial height, and underwent practically ideal barrel-shaped (bulbous) deformation until completion of the measurement. The flow ratio, defined as the quotient of compressive stress σ in MPa at 20% compression and the yield stress σ (see DIN EN ISO 604:2003-12, chapter 3.3.1), was used to assess the material flow characteristics. The value reported in table 1 for the flow ratio corresponds to the respective average value of the three individual measurements rounded to the second decimal place according to DIN 1333:1992-02 section 4.

Flexural Strength

In the present invention, the flexural strength and the flexural elasticity modulus were measured according to ISO 178:2011-04 method A with a test speed of 5 mm/min at a support distance of 60 mm. The measurements were performed at 23° C. and 50% relative humidity. The preferred procedure was as follows: Cylindrical test specimens having dimensions of length by diameter=100 mm×9.5 mm were used. The measurements were performed on 5 test specimens in each case. The flexural strength $\sigma_{fM}$ (maximum flexural stress borne by the test specimen during testing (see ISO 178: 2011-04, page 6, chapter 3.4)) was calculated according to the equation $$\sigma_{fm} = \frac{6 \times L \times \sigma_f}{\pi \times \phi^3},$$

wherein L is the support distance of 60 mm, $\sigma_f$ is the flexural stress in Newtons and Ø is the test specimen diameter in mm. The flexural elastic modulus $E_f$ was calculated according to the equation $$E_f = \frac{L^3 \times (\sigma_{f2} - \sigma_{f1})}{0.15 \text{ mm} \times \pi \times \phi^4},$$

wherein L is the support distance of 60 mm, $\sigma_{f1}$ is the flexural stress at 0.10 mm deflection in kilonewtons (kN), $\sigma_{f2}$ is the flexural stress at 0.25 mm deflection in kilonewtons (kN) and Ø is the test specimen diameter in mm. The value reported in table 1 for the flexural strength $\sigma_{fM}$ in MPa and the flexural elastic modulus $E_f$ in GPa corresponds to the respective average value of the individual measurements rounded to the nearest integer (flexural elastic modulus) or to one decimal place (flexural strength) according to DIN 1333:1992-02 section 4.

Molar Masses

In the context of the present invention, the number-average molar mass Mn and the weight-average molar mass Mw, in each case in units of g/mol and rounded to the nearest ten according to DIN 1333:1992-02 section 4, are determined by size exclusion chromatography (SEC/GPC) according to DIN 55672-1/ISO 160414-1 and ISO 160414-3 by calibration against polystyrene standards of a column assembly based on polystyrene-co-divinylbenzene as the stationary phase and composed of three columns having different pore size distributions in the sequence 10,000 Å, 500 Å and 100 Å with an exclusion size of greater than 450,000 g/mol. Phenyl-containing components are determined with a THF eluent and non-phenyl-containing components are determined with a toluene eluent. The analyzes are carried out at a column temperature of 45±1° C. using a refractive index detector.

In the examples which follow, all parts and percentages are by weight unless stated otherwise. Unless stated otherwise, the examples which follow are performed at ambient pressure, i.e. at about 1013 hPa, and at room temperature, i.e. about 23° C. or at the temperature attained on combining the reactants at room temperature without additional heating or cooling.

In the following
Me represents methyl, Vi represents vinyl, Ph represents phenyl.

EXEMPLARY EMBODIMENTS

Production of Siloxane Component 1

Under a nitrogen atmosphere, 29.6 g (1644 mmol) of deionized water were initially charged, before 840.0 g of absolute ethanol (commercially available from Sigma-Aldrich Chemie GmbH, Steinheim, Germany) were added and 66.4 g (1160 mmol) of solid sodium hydroxide (commercially available from Sigma-Aldrich Chemie GmbH, Steinheim, Germany) were dissolved therein, thus causing heating of the mixture to about 52° C. and slight clouding. The mixture was then allowed to cool to 35° C. with stirring before 400.0 g (1664 mmol) of triethoxyphenylsilane (CAS 780-69-8; commercially available from Sigma-Aldrich Chemie GmbH, Steinheim, Germany) were quickly added over 10 minutes, thus causing the temperature of the mixture to increase to 48° C. The mixture was stirred for a further 15 minutes, causing precipitation of a white solid, and then heated to 83° C. under reflux for 30 minutes, causing the mixture to become clear and colorless. The mixture was then slowly cooled to 23° C. and stirred for a further 6 hours. The suspension was then filtered and the filtercake dried for 1 hour at <1 mbar and 80° C. This afforded 233.4 g of a fine, white siliconate powder (siliconate 1) having a potassium: silicon ratio of 1:1 and a solids content, determined at 160° C. using a Mettler Toledo HR73 Halogen Moisture Analyzer, of 86.5% by weight which underwent complete dissolution in water to an extent of 50%.

Under a nitrogen atmosphere, 196.7 g (1062 mmol) of the thus produced siliconate 1 were initially charged and mixed with 518.0 g of anhydrous tert-butyl methyl ether (commercially available from Sigma-Aldrich Chemie GmbH, Steinheim, Germany) to form a readily stirrable suspension. 222.5 g (1844 mmol) of chlorodimethylvinylsilane (CAS 1719-58-0; commercially available from Sigma-Aldrich Chemie GmbH, Steinheim, Germany) were then slowly added, causing heating of the mixture and gas evolution. After addition of about 140 g, the mixture became markedly more viscous and exothermicity and gas evolution decreased. At this point, the remaining chlorodimethylvinylsilane was swiftly added; the temperature of the white, creamy suspension after completed addition was 56° C. The mixture was then heated to reflux at 56° C. for 3 hours and cooled to room temperature. 461.5 g (2562 mmol) of deionized water were then carefully added to the mixture, causing commencement of an exothermic reaction and gas evolution so that the temperature during addition was 27° C. to 33° C. After completed addition, the mixture was stirred for a further 30 minutes before the two phases formed were separated from one another. 55.0 g of tert-butyl methyl ether were added to the upper phase and the mixture was then filtered. A clear filtrate was obtained. The volatile constituents were distilled off and the residue devolatilized at 80° C. and 0.5 mbar. The thus obtained product (siloxane component 1) was obtained as a colorless, oily residue which, having the average composition $[(PhSi(OSiViMe_2)O_{2/2})_4]_{0.23}(PhSiO_{3/2})_{0.50}(ViMe_2SiO_{1/2})_{0.27}$, had a number-average molar mass Mn of 930 g/mol, a weight-average molar mass Mw of 1070 g/mol and a polydispersity of 1.15.

Production of Siloxane Component 2

400.0 g (1664 mmol) of triethoxyphenylsilane (CAS 780-69-8; commercially available from Sigma-Aldrich Chemie GmbH, Steinheim, Germany) and a mixture of 132.7 g (1064 mmol) of a 45% potassium hydroxide solution in water (commercially available from abcr GmbH, Karlsruhe, Germany) and 30.2 g (1676 mmol) of deionized water were simultaneously metered over 45 minutes into a 1 l stirred flask fitted with a KPG stirrer under a nitrogen atmosphere at 50° C. jacket heating, the mixing temperature not exceeding 55° C.; the mixture was then stirred for a further 15 minutes at 55° C. The mixture was allowed to cool slowly to 23° C. and was stirred for a further 6 hours. Drying of the mixture was carried out in a Buchi B-290 mini spray dryer, the hydrolyzate being sprayed into the spray chamber from above using a two-fluid nozzle at an input air temperature of 210° C. and a throughput of 5%. This afforded 190 g of a solid siliconate powder (siliconate 2) having a potassium:silicon ratio of 0.65:1 and a solids content, determined at 160° C. using a Mettler Toledo HR73 Halogen Moisture Analyzer, of 94.3% by weight.

Under a nitrogen atmosphere, 147.5 g (769 mmol) of the thus obtained siliconate 2 were initially charged and mixed with 295.0 g of anhydrous tert-butyl methyl ether (commercially available from Sigma-Aldrich Chemie GmbH, Steinheim, Germany) to form a readily stirrable suspension. 139.0 g (1152 mmol) of chlorodimethylvinylsilane (CAS 1719-58-0; commercially available from Sigma-Aldrich Chemie GmbH, Steinheim, Germany) were then slowly added over a period of 30 minutes, causing heating of the mixture and gas evolution; the temperature of the mixture increased to 56° C. After addition, the mixture was heated to reflux at 56° C. for 5 hours and then cooled to room temperature before 283.8 g (1575 mmol) of deionized water were carefully added over 2 minutes causing the temperature to decrease from 30° C. to 25° C. After completed addition, the mixture was stirred for a further 30 minutes before the two phases formed were separated from one another. The upper phase was filtered and the filtercake was subjected to portionwise washing with 77.0 g of tert-butyl methyl ether. A clear, yellowish filtrate was obtained. The volatile constituents of the combined filtrates were distilled off and the residue devolatilized at 100° C. and 0.5 mbar. The obtained product (siloxane component 2) was obtained as a colorless, slightly yellowish, oily residue having the average composition $(PhSiO_{3/2})_{0.69}(ViMe_2SiO_{1/2})_{0.31}$, a number-average molar mass Mn of 1160 g/mol, a weight-average molar mass Mw of 1310 g/mol and a polydispersity of 1.13.

Example 1

50.0 g of siloxane component 1 were mixed with 17.0 g of 1,4-bis(dimethylsilyl)benzene (CAS 2488-01-9; commercially available from abcr GmbH, Karlsruhe, Germany) in a Speedmixer™ DAC 150 FVZ from Hauschild & Co. KG for 10 seconds at 3000 rpm before the mixture was admixed with 0.02 g of a mixture of 1.0 g of Karstedt catalyst (CAS 68478-92-2; commercially available as platinum(0) divinyltetramethylsiloxane complex "KARSTEDT Concentrate 20% sol. L006P" from Heraeus Deutschland GmbH & Co. KG, Hanau, Germany) in 20.0 g of a polydimethylsiloxane having $ViMe_2Si$ end groups and an average viscosity of 800 to 1200 mPa·s (CAS 68083-19-2; commercially available as VINYLPOLYMER 1000 from Wacker Chemie AG, Munich, Germany); the mixture was mixed in the Speedmixer™ DAC 150 FVZ for 30 seconds at 3000 rpm, poured into the stainless steel cylinder molds and cured. The results of the measurements are summarized in table 1.

Example 2

The procedure described in example 1 was repeated with the modification that instead of siloxane component 1, 50.0 g of siloxane component 2 and 13.4 g of 1,4-bis(dimethylsilyl)benzene were employed; since viscosity increases upon prolonged storage, siloxane component 2 was heated to 70° C. for one hour and allowed to cool to ambient temperature before use. The results of the measurements are summarized in table 1.

TABLE 1

| Example | 1 | 2 |
|---|---|---|
| Flexural elastic modulus at 23° C. [GPa] | 1.0 | 1.0 |
| Flexural strength $\sigma_{fM}$ at 23° C. [MPa] | 31 | 35 |
| tan delta$_{max}$ | 1.051 | 0.859 |
| Full width at half maximum [° C.] | 13 | 16 |
| Flow ratio $\sigma_{20\%}:\sigma_y$ at 25° C. | 0.78 | 0.98 |

The invention claimed is:

1. A hydrosilylation-crosslinkable composition, comprising:
   (A) at least one aliphatically unsaturated organopolysiloxane produced by reaction of
   (i) alkali metal salts of silanol(s) of the formula $$R_aR^1_b(OH)_{3-p}Si(OM)_p \quad \text{(II)}$$

and/or condensation products thereof,
with the proviso that in component (i) the average molar ratio of alkali metal:silicon is 0.10 to 2.00,
with (ii) chlorosilanes of formula $$R^7_rR^8R^9_zSiCl \quad \text{(III),}$$

wherein
M is an alkali metal cation,
R and $R^7$ independently of one another are alkyl radicals,
$R^8$ are identical or different and represent monovalent hydrocarbon radicals having aliphatic carbon-carbon multiple bonds,
$R^1$ and $R^9$ independently of one another are identical or different and are aromatic hydrocarbon radicals free from aliphatic carbon-carbon multiple bonds, a is 0 or 1,
b is 0 or 1, with the proviso that a+b=1,
p is 1, 2 or 3,
r is 0, 1, 2 or 3 and
t is 0, 1 or 2, with the proviso that r+t=2,
with the proviso that siliconate component (i) and/or the chlorosilanes (ii) of formula (III) comprise at least one aromatic hydrocarbon radical free from aliphatic carbon-carbon multiple bonds,
(B) one or more organosilicon compounds having two Si-bonded hydrogen atoms and
(C) at least one catalyst which promotes addition of Si-bonded hydrogen onto an aliphatic multiple bond and wherein the composition comprises unconverted reactants (i) and (ii), and the unconverted reactants are present in an amount less than 0.5% by weight of the composition, or the aliphatically unsaturated organopolysiloxane (A) comprises a 3 or 4 membered cyclic ring.

2. The composition of claim 1, wherein in the production of component (A), 1.0 to 20.0 mol equivalents of chlorosilanes (ii) are employed per mol equivalent of siliconate component (i).

3. The composition of claim 1, wherein organopolysiloxanes (A) have an average of 9 to 25 silicon atoms.

4. The composition of claim 1, wherein organopolysiloxane(s) (A) are those having the average formula

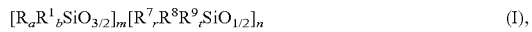
$$[R_a R^1_b SiO_{3/2}]_m [R^7_r R^8 R^9_t SiO_{1/2}]_n \quad (I),$$

wherein R, $R^1$, $R^7$, $R^8$, $R^9$, a, b, r and t are as defined above and
m is ≥0.50 and ≤0.70 and
n is ≥0.30 and ≤0.50,
with the proviso that in formula (I) the sum of b+t≠0 and the sum of m+n is 1.

5. The composition of claim 1, wherein at least one coupler (B) is an organosilicon compound containing units of formula

$$R^4_e H_f R^5_g SiO_{(4-e-f-g)/2} \quad (IV),$$

wherein
$R^4$ are identical or different and represent monovalent or divalent, SiC-bonded, optionally substituted, aliphatically saturated hydrocarbon radical,
$R^5$ are identical or different and represent monovalent or divalent, SiC-bonded, optionally substituted, aliphatically saturated aromatic hydrocarbon radicals,
e is 0, 1, 2 or 3,
f is 0, 1 or 2 and
g is 0, 1 or 2,
with the proviso that e+f+g≤4 and two Si-bonded hydrogen atoms are present per molecule.

6. The composition of claim 5, wherein coupler (B) contains, per molecule, at least one radical $R^5$ which is a divalent, SiC-bonded, aliphatically saturated aromatic hydrocarbon radical which connects two units of formula (IV) to one another.

7. The composition of claim 1, wherein the composition comprises:
(A) at least one aliphatically unsaturated organopolysiloxane produced by reaction of
component (i) with component (ii) optionally in the presence of organic solvent (iii) and optionally in the presence of an auxiliary base (iv), wherein the product mixture is optionally worked up in water, filtered and devolatilized,
(B) at least one organosilicon compound having two Si-bonded hydrogen atoms and
(C) at least one catalyst which promotes addition of Si-bonded hydrogen onto aliphatic A multiple bond,
optionally (D) inhibitor(s),
optionally (E) further constituents, and
optionally (F) solvent(s).

8. A process for producing the composition of claim 7, comprising mixing the individual components together.

9. The process of claim 8, wherein directly after the reaction of component (i) with chlorosilanes (ii), optionally in organic solvent (iii) and optionally in the presence of an auxiliary base (iv), component (A) is subjected to aqueous workup, devolatilized, and subsequently mixed with organosilicon component (B) and the optionally employed components inhibitor (D), further constituents (E) and solvent (F) in any desired sequence followed by addition of component (C), optionally as a mixture with component (D) or (F).

10. A molded article produced by crosslinking a composition of claim 1.

* * * * *